April 21, 1942. C. H. CARTWRIGHT ET AL Re. 22,076

PROCESS OF DECREASING REFLECTION OF LIGHT FROM SURFACES AND ARTICLES SO PRODUCED

Original Filed Dec. 27, 1938 2 Sheets-Sheet 1

Inventors:
Charles H. Cartwright,
Arthur F. Turner,
By Potter, Pierce & Scheffler Attorneys.

Inventors:
Charles H. Cartwright,
Arthur H. Turner,
By Potter, Pierce & Scheffler
Attorneys Reissued Apr. 21, 1942

Re. 22,076

UNITED STATES PATENT OFFICE 22,076

PROCESS OF DECREASING REFLECTION OF LIGHT FROM SURFACES AND ARTICLES SO PRODUCED

Charles Hawley Cartwright, Corning, and Arthur Francis Turner, Rochester, N. Y., assignors to Research Corporation, New York, N. Y., a corporation of New York Original No. 2,207,656, dated July 9, 1940, Serial No. 247,974, December 27, 1938. Application for reissue February 1, 1941, Serial No. 377,066

16 Claims. (Cl. 88—1)

This invention relates to the art of substantially eliminating the reflection of light from surfaces, and is concerned more particularly with the treatment of a surface of a light-transmitting article (e. g., a plate made of glass, Celluloid, Cellophane or resinous compositions, a lens, a prism, or the like) whereby substantially to eliminate the reflection of light from such surface. The invention is concerned also with improved light-transmitting articles which have been treated in accordance with the process hereinafter disclosed and claimed.

An object of this invention is the provision of a process for the production of articles exhibiting very low or substantially no reflection, examples of such articles being lenses, prisms, plates or the like, made of glass, quartz, transparent plastic composition or similar substances.

Another object of the invention is to provide a process for treating lenses, prisms, and optical elements generally, whereby to render such elements practically non-reflective and to increase their utility in optical instruments such as field-glasses, telescopes, microscopes, prism-binoculars, bomb-sights, periscopes, and the like. Such instruments are eminently suitable for night work or when the object to be viewed is poorly illuminated.

A further object of the invention is to provide a process for treating plates or sheets of glass, plastic composition, and similar light-transmitting materials whereby substantially to eliminate reflection from the surface of these articles and thereby to confer upon them desirable properties making them useful as non-reflective window panes, coverings for pictures, mirror glasses and like transparent shields.

A still further object is to provide improved articles having unique optical properties—particularly, articles which give little or no reflection. By eliminating the reflection from lenses, prisms and such optical elements, improved optical instruments embodying these elements may be made. Substantial elimination of "ghost images" in complicated optical systems is made possible by the use of the articles of this invention.

It has been known from the work of Fresnel during the early part of the 19th century that when light passes from air to a transparent material of index of refraction N, or conversely, a fraction of the incident light $$\left(\frac{N-1}{N+1}\right)^2$$

is reflected from the surface. This reflected light, amounting ordinarily to 4% or more per surface, in many cases creates disturbing images in an optical system, and always represents an amount of light that would otherwise be transmitted. If a film is deposited on a material, there is reflection at the surface air-to-film and at the interface film-to-material. If the optical thickness of the film is one quarter of the wavelength of a certain monochromatic light, and the index of refraction of the film is the square root of the material on a surface of which the film has been deposited, the reflections from the surface and the interface are exactly out of phase and completely cancel one another. Thus, if a film has an index of refraction the square root of 1.52 (the index of refraction of ordinary glass) and an optical thickness of 1250 Å, there will be zero reflection of monochromatic light having a wavelength of 5000 Å. The reflectance is also substantially eliminated throughout the entire visible spectrum, as will be seen from a consideration of Fig. 6 of the accompanying drawings. Figure 1 illustrates that a film having this index and an optical thickness $x/4$ times 5000 Å where $x$=any odd integer) will also produce zero reflectance for monochromatic light having a wavelength of 5000 Å. However, the region in which the reflectance is substantially eliminated decreases as $x$ is increased. The practically complete elimination of reflectance of white light is attained only when $x$ is equal to 1.

Many attempts have been made to eliminate the reflection of visible light from surfaces of transparent materials, such as glass by coating such surfaces with films of various substances. Thus, Katharine B. Blodgett and Irving Langmuir (Physical Review, vol. 51, page 964, 1937), describe a method wherein a "skeletonized" film of barium stearate is produced on glass. A mono-layer of stearic acid is spread on the surface of water containing barium salts, and is transferred to the glass by a process of dipping. This operation is repeated the requisite number of times to build up a film having the necessary thickness. Such a film has an index of refraction much too high to result in a material decrease in reflection of a glass surface but its index is then decreased by dissolving out the stearic acid with benzene, leaving a "skeletonized" film of barium stearate.

John Strong (Jour. Optical Soc. of Amer., vol. 26, page 73, 1935) made observations on the optical effects of films prepared by evaporating calcium fluoride onto a surface of a glass article, in high vacuum; he did not control the deposition so as to give proper film thicknesses and hence reduced the reflecting power of the glass surface only from about 4% to 3%. Strong also undertook to grade the index of refraction of a film of calcium fluoride, from a high index adjacent the glass to a small index adjacent the air boundary, by manipulating the air pressure in the evaporating chamber. The porosity of the outer surface of a graded film thus produced to give zero reflection is pronounced and disadvantageous.

We have found it possible to treat glass and other transparent materials in such a manner as to produce rugged films having any desired thickness and a wide range of refractive indices. A layer of solid coating substance may be applied to the surface to be treated by evaporating the coating substance in the vicinity of the surface while the surface and the substance are maintained in a rarefied atmosphere, in the manner now generally well known in the silvering of mirrors and the like (e. g., according to the general process of U. S. Patent No. 767,216 to Thomas A. Edison). That is to say, the article to be treated and a quantity of the solid coating substance are placed a suitable distance apart and within an evacuable chamber; the atmosphere within the chamber thereupon is evacuated to a suitable degree and maintained at that pressure; and the solid coating substance is heated, as by means of an electrical heating element likewise located within the chamber and connected by suitable leads to a source of electric current, to a temperature sufficient to vaporize the coating substance. A spiral of resistance wire so formed as to function as a "basket" for the reception of the solid coating substance has been found to be operable for the joint purpose of supporting the substance and, when made a part of the path of an electric current, of heating the solid substance to the vaporizing point. The sovaporized substance passes through the rarefied atmosphere of the chamber and condenses as an adherent film or layer on the surface of the article which is opposed to the source of the vapor.

The invention will be more particularly described and pointed out in the following description with reference to the drawings, in which Fig. 1 is a graph showing reflecting power, "R", plotted as a function of wavelength for a plate of glass each surface of which has a film of optical thickness 1250 Å with the index of refraction of the film equal to the square root of that of the glass.

The optical thickness of the layer deposited in the manner hereinbefore described is of paramount importance in the realization of the objects of the present invention. Thickness of the layer can be controlled by any one or more of the following measures:

*a.* Regulation of the temperature of the heating elements;

*b.* Regulation of the duration of the vaporization operation; and

*c.* Regulation of the distance between the heating element and the surface to be treated.

The optical thickness of the thus-deposited layer is controlled as it is being deposited on glass or other articles being coated by observing characteristic color changes which occur when white light strikes a monitoring surface, as will be described hereinafter. The monitoring surface is placed at an appropriate distance from the evaporating source so that the thickness of the film deposited on it is thicker than that deposited on the desired surface, and results in a conveniently distinguishable color reflection of the incident white light from the monitoring surface. In the case evaporation is carried out in high vacuum, the relative distance of the monitor can be calculated by the use of the inverse square law; in the case the evaporation is carried out in the presence of a slight gas pressure, the distance of the monitor can be determined empirically.

Figure 1:
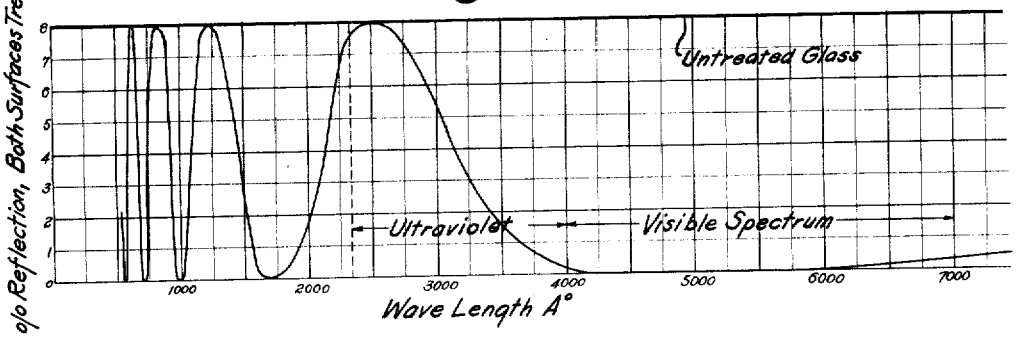
Figure 2:
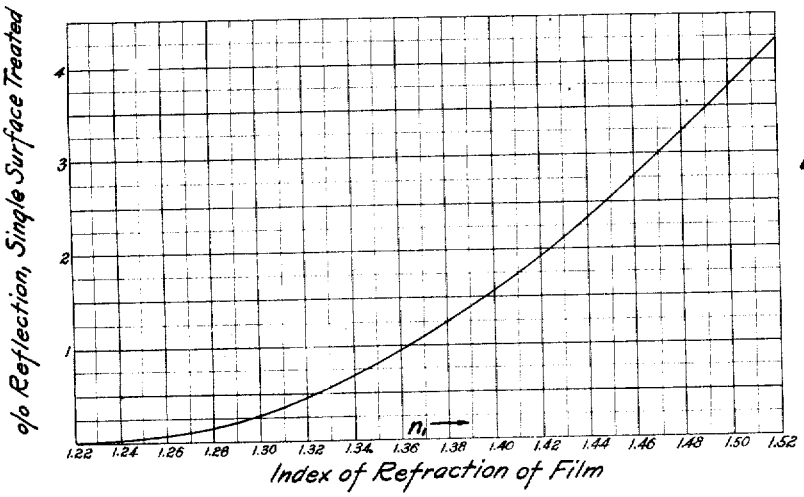
Fig. 2 is a graph illustrating the relationship between the index of refraction of a film and its minimum reflecting power, for a film having an optical thickness of $\lambda/4$ on glass having an index of refraction=1.52.

Although zero reflecting power of a film of the appropriate thickness is attained only when its index of refraction is the geometric mean (Clements & Wilson, "Manual of Mathematics and Mechanics," 1937, page 136) of the indices of refraction of the article being treated and of the contiguous air or other lighter, fluid, medium, the reflection will be sufficiently reduced for many purposes when the film has a somewhat larger index of refraction than the ideal. This is illustrated in Figure 2 for the treatment of ordinary glass having an index of 1.52, wherein it is shown that reflectance progressively decreases as the index of refraction of the coating layer progressively approaches the ideal, or geometric mean of the indices of the refraction of the article being treated and of the contiguous atmosphere.

The index of massive crystalline sodium fluoride is 1.33. A film having this index would, where air is the lighter medium, give zero reflection for a glass of index 1.78. For ordinary glass there should be about 0.5% reflection. Actually, the evaporated films may have a smaller index than that of the massive material from which they are produced and this index can be controlled by the following factors:

(1) The nature of the surface being treated (its composition, structure, polish and cleanliness).

(2) The velocity of the evaporated particles at the time they strike the surface being treated.

(3) The kind or kinds of gas present during evaporation as well as the gas pressure.

(4) The dimensions within the evaporating chamber.

(5) The rate of evaporation and whether it is continuous or interrupted.

(6) The temperature of the object being treated.

A lowering of the index of refraction of a material is always accompanied by a decrease in its density as given by the Lorentz-Lorenz equation or the Clausius and Mosotti equation:

Density is proportional to $(N^2-1)/(N^2+2)$

Figure 3:
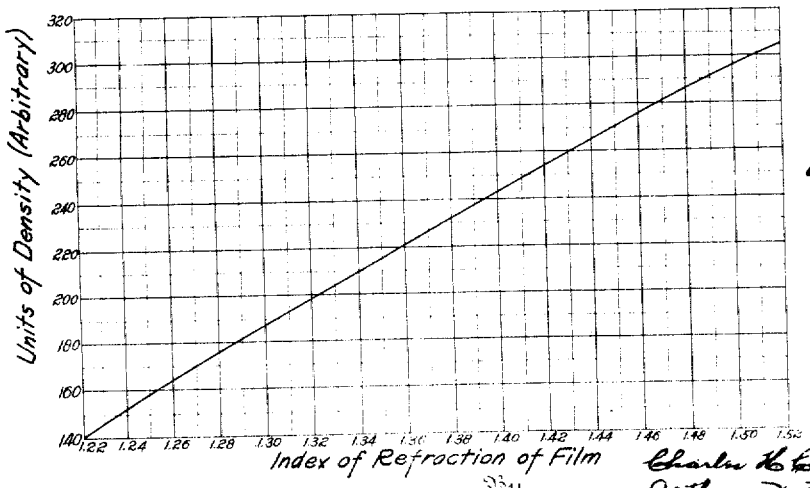
Fig. 3 is a graph showing relative density of film as a function of its index of refraction.

The manner in which the index of refraction of a material depends on its density is illustrated in Figure 3. It is known that the mechanical strength of a material depends on its structure and density and it is evident that too great a decrease in density will result in a mechanically frail film. One sees from considering the data in Figures 2 and 3 that it is best to choose a film material that already has a low index of refraction in its massive state and then only to reduce its density as little as possible so as to retain its hardness.

A method of preparing a non-reflecting glass plate, one of the simplest of optical elements, will now be described in detail:

A lantern-slide cover glass having an index of refraction of 1.52 was carefully cleansed and polished on both sides. The plate was tested in a Hardy color analyzer, which measures to 0.1%, and found to give a reflectivity of 8% for green light having a wave length of 5400 A. The plate was then placed in an apparatus like that above described, the air pressure within the chamber was reduced to $10^{-3}$ mm. of mercury, and lithium fluoride, supported by the heating element, was evaporated onto one side of the plate until the color of this surface by reflected daylight appeared faintly purplish. This operation required about one minute. The plate was then turned over to expose the other side of the plate to the vapors of lithium fluoride, and a layer of lithium fluoride was applied to this side of the plate in a similar way. The plate, thus coated on both sides, was again tested, and its reflectivity was found to have been reduced to 0.4% by the coating treatment, which represents a reduction in reflectivity somewhat greater than 94%. The transmission of the treated plate was found to have been increased by the coating treatment by an amount equivalent to the decrease in reflected light (e. g., increased to 99.6%) absorption being negligible.

Other base materials which successfully have been treated by the process of this invention, include quartz, plastic compositions such as "Cellophane," mica, as well as numerous types of glass, and similar materials, in the form of plates, lenses, prisms and the like. The process is intended to include within the genus of base materials suitable for the application of layers in accordance with the teachings of this invention all manner of non-metallic, solid materials, the surfaces of which normally exhibit relatively high reflection.

Film-forming substances other than lithium-fluoride which have been used to produce the treated articles of this invention include magnesium fluoride, calcium fluoride, sodium fluoride, sodium aluminum fluorides (e. g., cryolite). It is contemplated to include broadly within the scope of this invention all solid, non-opaque substances capable of being evaporated and of being applied to a base material in layers thin enough substantially to reduce the reflection from the surface of said base material pursuant to the teachings herein disclosed.

A discussion of the theoretical considerations involved in computing reflections from naked surfaces and surfaces coated with very thin layers of light-transmitting substance will now be given for the purpose of clarifying the present invention.

As was noted above, Fresnel has shown that the loss of light normally incident at an air-glass surface is $$R=\left(\frac{N-1}{N+1}\right)^2$$

in which formula R is the reflected portion of the incident light, and N is the index of refraction of the glass. For glass having an index of refraction of 1.5, about 4% of the light is reflected from the entering surface of the glass.

The amplitude of the reflected wave in air is $$A=\frac{N-1}{N+1}=\sqrt{R}$$

Figure 4:
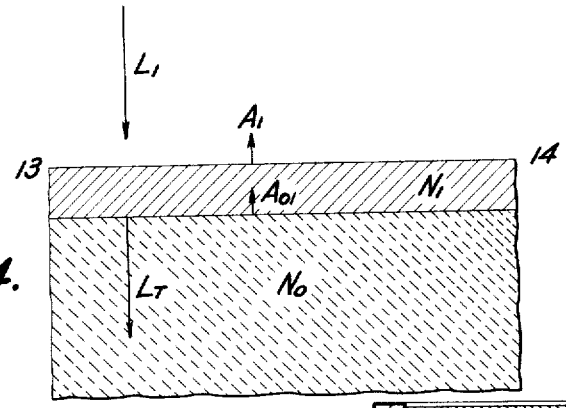
Fig. 4 is a greatly enlarged cross sectional view of the surface of an article bearing a coating applied as hereinafter disclosed.

In Fig. 4 is shown a greatly enlarged cross-sectional view of a layer of non-metallic substance having an index of refraction of $N_1$ borne by a base of substance having an index of refraction of $N_0$.

$L_1$ is a vector representing a beam of monochromatic light normally incident on the surface 13, 14, $A_1$ is a vector representing the amplitude of the wave theoretically reflected from the surface of the coating into the air, and $A_{01}$ is a vector representing the amplitude of the wave theoretically reflected from the interface of the base and coating layer.

Figure 5:
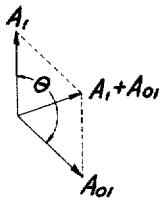
Fig. 5 is a graphical addition of the amplitudes of two light waves.

The quantities $A_1$ and $A_{01}$ are vectors, and to obtain the amplitude of the resulting reflected wave obtained by the interference of $A_1$ and $A_{01}$, these quantities must be added as vectors. Fig. 5 of the drawings shows such an addition when the vectors are reunited. The angle $\theta$ is given by the expression, $$\theta=2\pi\frac{2N_1d}{\lambda}$$

in which $N_1d$ is the optical thickness of the coating layer and $\lambda$ is the wave length of the incident light.

The minimum amplitude of the resultant reflected wave occurs when the vectors are oppositely directed, or where $\theta$ is equal to 180°, in which case, $$N_1d=\frac{1}{4}\lambda,\ \frac{3}{4}\lambda,\ \frac{5}{4}\lambda\ \ldots\ \frac{x}{4}\lambda$$

In the above series, $x$ is any odd positive integer. We have found that coating layers having an optical thickness greater than $$\frac{9}{4}$$

the wave length of the incident light give an interference range too narrow to be of practical importance.

It appears from an inspection of Fig. 5 that conditions for zero reflection or complete interference theoretically will be realized when, in addition to being 180° apart, the numerical values of $A_1$ and $A_{01}$ are equal.

$$A_1=\frac{N_1-1}{N_1+1}$$

and $$A_{01}=\frac{N_0-N_1}{N_0+N_1}$$

Equating $A_1$ and $A_{01}$ the following expression is obtained:

$$\frac{N_1-1}{N_1+1}=\frac{N_0-N_1}{N_0+N_1}$$

from which it is calculated that $$N_1^2=N_0$$

Thus theoretically it is shown that for complete elimination of reflection from the coated article by interference between the reflected wave from the air-coating surface and the reflected wave from the coating-base interface, two conditions must be met, namely, the optical thickness of the coating must be substantially $$\frac{x}{4}$$

the wave length of the incident light, $x$ in the above fraction being a small, positive, odd integer, and the effective index of refraction of the coating layer must be the geometric means between the index of refraction of the base material and the index of refraction of the lighter medium,—e. g., must be equal to the square root of the index of refraction of the base material when the index of refraction of the less dense medium is unity.

Of these two conditions we have found that the optical thickness of the deposited layer is of paramount importance, and that the control of this factor must be closely regulated if articles exhibiting low reflection of light are to be produced.

The thickness of the film is measured as it is being applied to the glass plate, or other article being coated, by observing characteristic color changes which occur when daylight is reflected from the film-coated surface. As the film gradually increases in thickness, a point is reached where the light of shortest visible wave length begins to be eliminated from the reflected visible light. This elimination of violet and blue components from the visible spectrum causes the remainder of the reflected light to appear reddish. As progressively higher wave lengths are eliminated, by increasing the thickness of the layer, the color of the layer becomes predominantly red but less intense.

Figure 6:
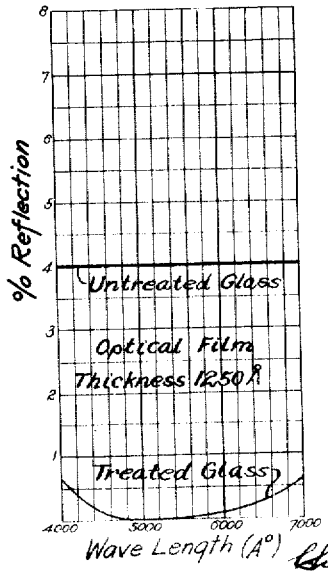
Fig. 6 is a chart showing the reflections of light from an uncoated optical element and from a coated optical element as a function of the wave length of the incident light.

As the optical thickness of the film is increased, the curve in Fig. 6, which shows the reflections of light from the surface of an untreated glass plate and from the surface of a glass plate bearing a layer of substance as a function of the wave length of incident light, moves from left to right. When the minimum of the curve passes 4000 Å on the horizontal axis of the chart, violet light begins to make its reappearance in the reflected spectrum. The reappearing violet light blends with the gradually disappearing red light, giving a characteristic purple color to the film. If the thickness of the film further is increased, the red reflection becomes almost entirely eliminated, and the film appears blue to the eye.

Optimum conditions for elimination of reflection of daylight occur, in the case of a glass having an index of refraction of 1.52 and a less dense medium having an index of refraction of unity, when the optical thickness of the film is about 1250 Å. Under these conditions, a substantial elimination of reflection is obtained, and the reflected red and blue fractions of relatively low intensity are more or less equalized.

The percentage of light removed as reflected red and blue from daylight falling on a plate of glass which carries a film of about 1250 Å in optical thickness is so small that the transmitted light appears white to the eye.

In depositing non-reflecting layers on surfaces, it is advisable to use a "monitor" to follow the course of deposition. Thus, in the case of treating a surface of a glass article, e. g., plate, a second "monitor" piece of glass of similar properties to those of the article to be treated may be placed a little closer to the heater element than the said plate, but displaced to one side thereof. Because the monitor is closer to the source of evaporated molecules, the layer deposited upon it is thicker than the layer simultaneously being deposited upon the plate, and the ratio of these thicknesses is substantially inversely proportional to the ratio of the squares of the distances between the source of evaporated molecules and the plate surfaces. During application of the film, the layer deposited on the monitor will undergo its characteristic color changes in advance of the layer deposited on the plate, and by knowing the thickness of the layer on the monitor and applying the "inverse square" relationship, the thickness of the layer on the plate readily may be calculated.

In treating glass optical elements to minimize the reflection of daylight, it is desirable to position a monitor about 5% closer to the evaporator than the distance between the optical element and the evaporator. When the optical thickness of the film on the optical element has reached the correct thickness (about 1250 Å), daylight reflected from it appears purplish, and a slight increase in thickness makes the reflected light bluish. This monitor, however, which is closer to the evaporator, has passed through the purplish stage and appears bluish. The color change from purple to bluish is easily noticed on the monitor, and when this change occurs, the thickness of the layer on the plate is optimum for the desired purpose, and the deposition of the film is heated. It may also be very convenient to have the "monitor" somewhat closer to the heater, and to obtain a maximum reflection of a conveniently-seen color on it. The distance of the monitor is determined so that the thickness on the surface being treated will be the desired one. If the evaporation is carried out in high vacuum, this distance can be calculated from the inverse square law and the equation $$R \cong A_1^2 + A_{01}^2 + 2A_1A_{01} \cos 2\pi \frac{2nd}{\lambda}$$

which is illustrated in Figure 5.

It is to be understood, in this connection, that there are methods by which the minimum reflecting power could be detected by electrical instruments during the evaporation.

Optical surfaces suitable for work in the ultraviolet must have a thinner non-reflecting layer applied than such surfaces prepared to eliminate reflection in the visible range, while for work in the infra-red, the layer must be thicker. Layers for non-visible spectral regions accurately can be applied in practice by placing the object to be coated either farther away from or closer to the evaporator than the position of the monitor in accordance with the requirements as indicated by the "inverse square law". When the characteristic color of daylight reflected from the coated surface of the monitor has reached a predetermined value, the thickness of the film on the object will be approximately that which calculation has prophesied.

The requirements of optical thickness of layers for work in the non-visible regions of the spectrum are the same as for layers for work in the visible, that is, the optical thickness of the layer should be a multiple of $$\frac{x}{4}\lambda$$

in which expression $x$ is a small, positive, odd integer, and $\lambda$ is the wave length of light the reflection of which is desired to be reduced. Preferably, the optical thickness of the film is $$\frac{1}{4}\lambda$$

While the discussion hereinbefore set forth has been limited in theory and practice to articles bearing a film of coating material comprising a single layer of a single substance, it is possible also to apply films comprising a mixture of two or more different substances. For example, a mixture of two or more metallic fluorides may be simultaneously applied to the surface of an article by a process similar to that already described. A large decrease in the amount of light reflected is obtained when the optical thickness of the film is substantially $$\frac{x}{4}\lambda$$

Films may be prepared comprising a laminated structure, the laminae being successively deposited on the base. For example, such a film may be deposited in two or more operations. A material of suitable index may first be applied to the base, the optical thickness of this layer being substantially $$\frac{x}{4}\lambda$$

on top of this layer there is applied a very thin layer of another material. The surface layer, being mechanically stronger than the substratum, serves to protect the latter from disturbing influences, and renders the combined film considerably more durable than an equivalent film of the first material alone. We have found, for example, that deposition of a thin layer of zircon or quartz overlying a film of magnesium fluoride serves to protect the substratum. Laminated films comprising more than two layers may be prepared in like manner. The use of laminated films for the protection of the substratum is to be distinguished from a method (which we have recently discovered) of using laminated films to eliminate reflection by properly choosing the thicknesses and indices of the laminae with regard to each other in such a manner that the vector sum of the reflected amplitudes from the surface and interfaces is zero.

We have found that the reflection-reducing film may be caused to adhere to the surface (e. g., of glass) to be treated by the following special measure: After the surface of the glass article has been suitably cleansed and dried and the glass article has been mounted in the evaporation chamber and the chamber has been suitably evacuated, we may evaporate chromium onto the glass surface in an amount to provide a layer several atoms thick, and thereupon "break the vacuum" within the chamber and allow atmospheric air to contact the chromium layer. The latter rapidly oxidizes to yield a transparent oxide of chromium layer which is firmly adherent to the glass. Thereupon, the chamber is again evacuated, and the selected reflection reducing film,—e. g., sodium aluminium fluoride, or equivalent,—is applied over the oxide of chromium layer, in the manner hereinbefore described. The observance of this special preliminary step materially improves the ruggedness and permanence of the resulting product. In this connection we note that the oxide of chromium layer is very thin; also, that its thickness is disregarded in determining the thickness of the reflection-reducing film (as is true, also, in the case of a protective outer layer of quartz or equivalent overlying the reflection-reducing film).

To sum up, the requirements for minimizing the reflection of light from the surface of an optical element include depositing or forming a light transmitting film upon the surface of the optical element, which film has an optical thickness approximating $$\frac{x}{4}$$

the wave length of the light impinging upon the surface where $x$ is a positive odd integer preferably not greater than 9. Preferably the refractive index of the film is adjusted to a value substantially equal to the square root of the index of refraction of the optical element. When the light the reflection of which is to be altered or summarized is monochromatic, the optical thickness of the film is chosen to be $$\frac{x}{4}$$

the wave length of said light, and nearly complete elimination of reflection is obtained. When the incident light is heterochromatic, as for example when daylight is desired to be substantially completely transmitted, and the reflection thereof minimized, the wave length of the light is assumed to be an average value, say 5000 Å in the case of daylight, and the optical thickness of the film is based upon this value. By choosing such an average value the maximum reduction in reflection over the entire range of visible light is attained. This is clearly shown in Fig. 6 where the area between the lower curve and the horizontal axis of the chart represents the total reflection of light within the visible range from glass coated with a film having an optical thickness of 1250 Å.

We have found that glass plates (or equivalent glass shapes) provided, by the carrying out of the present process, with the reflection-reducing films hereinbefore described, are peculiarly adapted for use in fabricating devices designed to receive solar energy to be converted into useful power. One type of solar heat collector is a thermally insulated container 21 (see Fig. 7) provided with a window 22, 22 for the admission of solar radiation, adjacent the bottom of which container there is positioned a blackened metallic plate 23 as receiver for the incident solar radiation: the temperature of this plate is raised by the absorption of the radiant solar energy, and this temperature rise may be used to heat a suitable fluid in contact with the blackened plate. Heat so transferred to the circulating fluid may in turn be utilized for heating purposes, or to drive an engine, etc.

In order to make this solar energy receiver "ideal", the "window" 22, 22 should be perfectly transparent for radiation in the wavelength range occupied by solar radiation (i. e., about 0.3–2.5$\mu$) and be perfectly opaque in the wavelength range covered by the long wavelength heat radiation from the receiver (i. e., 7–9$\mu$). A single pane of glass (or Cellophane, or similar substance) is highly opaque to the long wavelength radiation but does not transmit the shorter waves as well as is to be desired. While it is true that a good quality glass can be chosen so as to have a negligible absorption there still remains the problem of loss by reflection, this latter amounting to about 4% per surface for ordinary glass (e. g., a plate of ordinary glass transmits only about 92% of the incident light).

Figure 7:
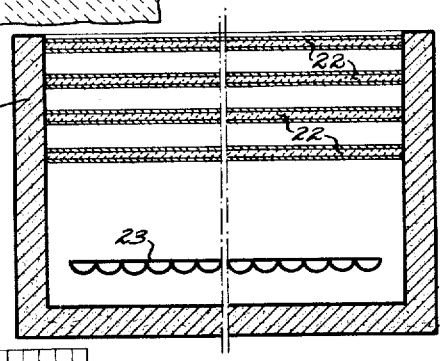
Fig. 7 is a schematic representation of a solar energy receiver equipped with glass panes treated in accordance with the present invention.

This poor transmission quality is multiplied in its effect by the fact that the window must be multi-layered in order to reduce losses by convection currents. Division of the space between the blackened plate and the outer surface of the window by spaced parallel panes of glass produces layers of stagnant air, thus diminishing energy loss by convection. Using ordinary glass, it has been found desirable to use from 3 to 6 (as shown in Fig. 7) spaced parallel glass panes, depending on the amount of available solar radiation and the desired equilibrium temperature of the blackened plate receiver. The use of a plurality of spaced, parallel, untreated, glass plates reduces losses to the outer atmosphere by convection (and radiation) but it also reduces, to an even greater extent, the amount of incident radiation arriving at the blackened plate. It will be appreciated that by thus multiplying the number of reflective surfaces one multiplies the losses arising from reflection.

The above described type of solar energy receiver is known as a "hot-box," and it functions as follows in converting the incident radiation into heat: the incident radiant energy (visible and non-visible) is absorbed by the blackened plate, thereby causing a rise in the temperature of the latter. The plate, however, will lose energy to its surroundings by (1) conduction (2) convection (in the case of an air-filled "hot-box" as here), and (3) radiation. The temperature of the plate rises until the rate of energy loss becomes equal to the rate of gain of absorbed energy. To attain a maximum rise in temperature those three losses must be reduced to a minimum. In directions other than that of the window of the box this may be accomplished, by standard methods of insulation, to any desired degree. But the window also forms a part of the surroundings of the plate, so that it must be chosen not only for its fitness as regards the three modes of energy loss but also for its efficiency in transmitting incident solar radiation. On the ability to construct a window fulfilling these requirements to a sufficient degree hinges the success of the "hot-box" collector.

The present invention relates, in one of its aspects, to an improvement in the window of the "hot-box" collector, and consists essentially in a "hot-box" window composed of a plurality of spaced parallel glass plates 22, 22 whose surfaces have been treated, to reduce loss of light by reflection to a low degree, by the carrying out of the process hereinbefore described. Said treatment does not, to any appreciable extent, change the glass' desirable quality of opaqueness to long wavelength radiation but does increase the transmission of a sheet or plate to about 99% or more of the shorter waves. We have found that by the use of the so-treated glass panes we are able,—with a large gain in efficiency,—to employ a larger number of them, in the described relation, than could be employed in the case of the untreated panes, and thereby to reap advantages both in reduction of losses by convection and radiation and in increased transmission of the solar radiation.

We claim:

1. Method of treating a surface of a solid light-transmitting optical element to reduce the light-reflectance thereof, which comprises evaporating onto such surface a layer of a normally solid and stable, metallic fluoride, and controlling the evaporation so as to produce said layer with an optical thickness approximately one-fourth the wavelength of light the reflection of which from said surface is to be reduced and an effective index of refraction approaching the square root of that of the optical element.

2. Method of treating a surface of a solid light-transmitting optical element to reduce the light-reflectance thereof, which comprises evaporating onto such surface a layer of a normally solid and stable, metallic fluoride, and applying over said layer a protective film of a light-transmitting material of the group consisting of quartz and zircon, the layer of metallic fluoride having an effective index of refraction approaching the square root of that of the optical element and being thicker than the protective film, and the sum of the layer of metallic fluoride and the protective film having an optical thickness approximately one-fourth the wavelength of light the reflection of which from said surface is to be reduced.

3. Method of treating a surface of a solid light-transmitting optical element to reduce the light-reflectance thereof, which comprises evaporating onto such surface a very thin film of chromium, oxidizing the film of chromium, and evaporating onto the chromium-oxide filmed surface a layer of a stable, normally solid, metallic fluoride, said metallic fluoride layer having an optical thickness approximating one-fourth the wavelength of light the reflection of which from said surface is to be reduced and an effective index of refraction approaching the square root of that of the optical element.

4. An optical element exhibiting low reflectance of light of preselected wavelength, comprising a solid light-transmitting body portion having a surface normally partially reflective to said light and a deposit of controlled thickness on said surface, said deposit comprising a light-transmitting layer of a solid and stable metallic fluoride, said layer having an optical thickness approximating one-fourth said wavelength and an effective index of refraction approaching the square root of that of said body portion.

5. Optical element as defined in claim 4, in which the metallic fluoride is calcium fluoride.

6. Optical element as defined in claim 4, in which the metallic fluoride is magnesium fluoride.

7. Optical element as defined in claim 4, in which the metallic fluoride is cryolite.

8. An optical element exhibiting low reflectance of light preselected wavelength, comprising a solid light-transmitting body portion having a surface normally partially reflective to said light, and a coating on said surface, said coating comprising a light-transmitting layer of a normally solid and stable, metallic fluoride, said layer having an effective index of refraction approaching the square root of that of the composition of said body portion and an outer protective film of a light-transmitting material of the group consisting of quartz and zircon, the sum of the layer of metallic fluoride and of the protective film having an optical thickness approximating one-fourth said wavelength.

9. An optical element exhibiting low reflectance of light preselected wavelength, comprising a solid light-transmitting body portion having a surface normally partially reflective to said light, and a coating on said surface, said coating comprising a very thin film of chromium oxide adhering to the surface of the body portion and overlying said chromium oxide film an adherent light-transmitting layer of a normally solid and stable, metallic fluoride, said layer having an optical thickness approximating one-fourth said wavelength and an effective index of refraction approaching the square root of that of the composition of said body portion.

10. An optical element exhibiting low reflectance of light preselected wavelength, comprising a solid light-transmitting body portion having a surface normally partially reflective to said light, and a coating on said surface, said coating comprising a light-transmitting layer of a plurality of normally solid and stable, metallic fluorides, said layer having an optical thickness approximating one-fourth said wavelength and an effective index of refraction approaching the square root of that of the composition of said body portion.

11. In the process of treating a normally partially light-reflective surface of a solid light-transmitting optical element, to reduce the light-reflectance thereof, by depositing by evaporation onto said surface a transparent layer of a normally solid and stable metallic fluoride having an effective index of refraction approaching the square root of that of the material constituting said optical element, the step of controlling the thickness of the deposited layer which consists in terminating the deposition when a color characteristic that varies with the deposition of the fluoride corresponds to a predetermined standard, indicative of an optical thickness of said fluoride layer on said surface of substantially $x/4$ the wavelength of said light, $x$ being a small positive odd integer not greater than 9.

12. In the process of treating a normally partially light-reflective surface of a solid light-transmitting optical element, to reduce the light-reflectance thereof, by depositing by evaporation onto said surface a transparent layer of a normally solid and stable metallic fluoride having an effective index of refraction approaching the square root of that of the material constituting said optical element, the method of controlling the thickness of the deposited layer which comprises evaporating the fluoride simultaneously onto the surface of the optical element and onto a surface of a monitor in the vicinity of said optical element, and terminating the evaporation of the fluoride when a color characteristic of the fluoride layer on said monitor attains a preselected standard indicative of a fluoride layer on the surface of the optical element of an optical thickness equal to $x/4$ the wavelength of the light the reflection of which from said surface is to be reduced, $x$ being an odd integer from 1 to 9.

13. In the process of treating a normally partially light-reflective surface of a solid light-transmitting optical element, to reduce the light-reflectance thereof, by depositing by evaporation onto said surface a transparent layer of a normally solid and stable metallic fluoride having an effective index of refraction approaching the square root of that of the material constituting said optical element, the method of controlling the thickness of the deposited layer of metallic fluoride which comprises terminating the deposition when a color characteristic of the fluoride layer being deposited on said surface, which color characteristic varies with the thickness of said layer, attains a predetermined standard indicative of an optical thickness of said fluoride layer on said surface of substantially $x/4$ the wavelength of said light, $x$ being a small positive integer not greater than 9.

14. In the process of treating a normally partially light-reflective surface of a solid light-transmitting optical element, to reduce the light-reflectance thereof, by depositing by evaporation onto said surface a transparent layer of a normally solid and stable metallic fluoride having an effective index of refraction approaching the square root of that of the material constituting said optical element, the method of controlling the thickness of the deposited layer of metallic fluoride which comprises terminating the deposition when a color characteristic of the fluoride layer being deposited on said surface, which color characteristic varies with the thickness of said layer, attains a predetermined standard indicative of an optical thickness of the fluoride layer substantially equal to one-fourth the wavelength of the light the reflection of which from said surface is to be reduced.

15. In the process of treating a normally partially light-reflective surface of a solid light-transmitting optical element, to reduce the light-reflectance thereof, by depositing by evaporation onto said surface a transparent layer of a normally solid and stable metallic fluoride having an effective index of refraction approaching the square root of that of the material constituting said optical element, the method of controlling the thickness of the deposited layer of metallic fluoride which comprises terminating the deposition when the color of the treated surface appears reddish to bluish by reflected light having the spectral characteristics of daylight.

16. In the process of treating a normally partially light-reflective surface of a solid light-transmitting optical element, to reduce the light-reflectance thereof, by depositing by evaporation onto said surface a transparent layer of a normally solid and stable metallic fluoride having an effective index of refraction approaching the square root of that of the material constituting said optical element, the method of controlling the thickness of the deposited layer of metallic fluoride which comprises terminating the deposition when the color of the treated surface appears faintly purplish by reflected light having the spectral characteristics of daylight.

CHARLES HAWLEY CARTWRIGHT.
ARTHUR FRANCIS TURNER.

DISCLAIMER

Re. 22,076.—*Charles Hawley Cartwright*, Corning, and *Arthur Francis Turner*, Rochester, N. Y. PROCESS OF DECREASING REFLECTION OF LIGHT FROM SURFACES AND ARTICLES SO PRODUCED. Patent dated April 21, 1942. Disclaimer filed December 20, 1943, by the assignee, *Research Corporation*.

Hereby enters this disclaimer to claims 1, 4, 5, 6, 7, 11, 13, 14, 15, and 16 of said patent.

[*Official Gazette February 1, 1944.*]